(12) United States Patent
Drejak

(10) Patent No.: US 11,062,613 B2
(45) Date of Patent: Jul. 13, 2021

(54) METHOD AND SYSTEM FOR INTERPRETING THE SURROUNDINGS OF A UAV

(71) Applicant: Everdrone AB, Säve (SE)

(72) Inventor: Maciek Drejak, Västra Frölunda (SE)

(73) Assignee: EVERDRONE AB, Säve (SE)

( * ) Notice: Subject to any disclaimer, the term of this patent is extended or adjusted under 35 U.S.C. 154(b) by 172 days.

(21) Appl. No.: 16/357,542

(22) Filed: Mar. 19, 2019

(65) Prior Publication Data

US 2019/0311637 A1      Oct. 10, 2019

(30) Foreign Application Priority Data

Apr. 5, 2018 (EP) .................................... 18165958

(51) Int. Cl.
*G08G 5/00* (2006.01)
*G06T 7/11* (2017.01)
(Continued)

(52) U.S. Cl.
CPC ......... *G08G 5/0073* (2013.01); *B64C 39/024* (2013.01); *B64D 47/08* (2013.01);
(Continued)

(58) Field of Classification Search
USPC ........................................................ 701/120
See application file for complete search history.

(56) References Cited

U.S. PATENT DOCUMENTS 9,396,400 B1    7/2016  Teichman et al.
9,826,202 B2    11/2017 Eline et al.
(Continued)

FOREIGN PATENT DOCUMENTS

WO       2017002367 A1    1/2017

OTHER PUBLICATIONS

Voronin V.V., et al., Depth Map Occlusion in Filling and Scene Reconstruction Using Modified Exemplar-based Inpainting, Image Processing: Algorithms and Systems XIII, SPIE-IS&T vol. 9399 93990S, 2015, 11 pages.
(Continued)

*Primary Examiner* — Tyler D Paige
(74) *Attorney, Agent, or Firm* — Edell, Shapiro & Finnan, LLC

(57) ABSTRACT

A method for improving the interpretation of the surroundings of a UAV, and to a UAV system is presented herein. The method comprises the steps of acquiring an image comprising depth data, and determining a boundary between a first image portion and a second image portion. The second image portion surrounds the first image portion, and the boundary is defined by an interface between first periphery sub-portions and second periphery sub-portions. A difference in depth data between adjacent first periphery sub-portions and second periphery sub-portions is above a first predetermined threshold and/or second periphery sub-portions comprises undefined depth data. The method further comprises determining the area of the first image portion, and if the area of the first image portion is below a second predetermined threshold, determining that the first image portion contains incorrect depth data and deleting and/or adjusting the incorrect depth data contained by the first image portion.

19 Claims, 4 Drawing Sheets

(51) Int. Cl.
    *B64C 39/02*     (2006.01)
    *B64D 47/08*     (2006.01)
    *G06T 7/55*     (2017.01)
    *G06T 5/00*     (2006.01)

(52) U.S. Cl.
    CPC ............... *G06T 5/005* (2013.01); *G06T 7/11* (2017.01); *G06T 7/55* (2017.01); *B64C 2201/141* (2013.01); *G06T 2207/10028* (2013.01); *G06T 2207/30252* (2013.01)

(56) References Cited

U.S. PATENT DOCUMENTS

| | | |
|---|---|---|
| 2013/0106849 A1 | 5/2013 | Ha et al. |
| 2013/0176487 A1 | 7/2013 | Nakashima |
| 2014/0055560 A1 | 2/2014 | Fu et al. |
| 2014/0240469 A1* | 8/2014 | Lee .................. H04N 13/25 348/48 |
| 2014/0241614 A1* | 8/2014 | Lee .................. H04N 13/254 382/154 |
| 2016/0219223 A1 | 7/2016 | Eline |
| 2016/0300361 A1* | 10/2016 | Xie .................. G06N 20/00 |
| 2017/0150053 A1 | 5/2017 | Eline |
| 2018/0025505 A1* | 1/2018 | Huang .................. G06T 7/55 382/154 |
| 2018/0184070 A1* | 6/2018 | Nash .................. G06T 7/593 |
| 2019/0035099 A1* | 1/2019 | Ebrahimi Afrouzi ... G01S 17/86 |
| 2019/0206073 A1* | 7/2019 | Huang .................. G01C 11/02 |
| 2019/0236764 A1* | 8/2019 | Lindsey .................. B64C 39/024 |
| 2019/0311637 A1* | 10/2019 | Drejak .................. G06T 7/11 |
| 2021/0004977 A1 | 1/2021 | Drejak |

OTHER PUBLICATIONS

Extended European Search Report for European Patent Application No. 18165958.2-1210 dated Oct. 17, 2018, 9 pages.
Communication pursuant to Article 94(3) for European Patent Application No. 19184606.2, dated Jun. 9, 2020, 6 pages.
Extended European Search Report for European Patent Application No. 19184606.2 dated Dec. 18, 2019, 10 pages.

\* cited by examiner

METHOD AND SYSTEM FOR INTERPRETING THE SURROUNDINGS OF A UAV

CROSS REFERENCE TO RELATED APPLICATIONS

This application claims priority to and is based on European Patent Application No. 18165958.2, filed Apr. 5, 2018, entitled "A Method for Improving the Interpretation of the Surroundings of a UAV, and a UAV System," the entire disclosure of which is incorporated herein by reference.

FIELD OF THE INVENTION

The present invention relates to a method for improving the interpretation of the surroundings of an unmanned aerial vehicle (UAV). It also relates to a UAV system comprising a UAV comprising at least one sensor unit configured to capture an image of a surrounding environment, and a control unit configured for processing said image.

BACKGROUND OF THE INVENTION

Unmanned aerial vehicles (UAVs), also known as drones, are aircrafts without a human pilot aboard the vehicle. There are several different types and sizes of UAVs, and they may be used in a number of different application areas. For example, UAVs may be used to deliver different types of goods, such as products that have been purchased online or medical equipment, e.g. defibrillators, to the scene of an accident. Other areas of use are also possible, such as surveillance and photography.

When using UAVs, especially in urban environments, safety is essential. If the UAV would crash or fail in navigating correctly over a crowded area, both property and humans may be endangered. Therefore, it is crucial that the UAVs do not fail during flight. UAVs typically comprise a number of different sensors to ensure a safe flight and to navigate. These sensors may capture an image of a surrounding environment, which image may suitably comprise depth data. The images may sometimes comprise artifacts causing the UAV to receive an at least partly incorrect image of the surrounding environment which may disturb the performance of the UAV, and there is therefore a need for improving the interpretation of the surroundings of a UAV.

SUMMARY OF THE INVENTION

It is an object of the present invention to alleviate at least some of the mentioned drawbacks of the prior art and to provide a method for improving the interpretation of the surroundings of an unmanned aerial vehicles (UAV), by deleting or adjusting the artifacts. This and other objects, which will become apparent in the following, are accomplished by a method and a UAV system as defined in the accompanying independent claims.

The term exemplary should in this application be understood as serving as an example, instance or illustration.

The present invention is based on the realisation that the artifacts are often presented as islands in the image, i.e. as small confined areas wherein the depth data differs significantly from the area surrounding the artifact. By identifying the boundary of such islands and determining the area of them, the artifacts can be identified and consequently the incorrect depth data contained by them can be deleted or adjusted.

According to a first aspect of the present invention, a method for improving the interpretation of the surroundings of a UAV is provided. The UAV comprises at least one sensor unit configured to capture an image of a surrounding environment. The method comprises the steps of:

acquiring said image comprising depth data from said sensor unit, determining a boundary between a first image portion and a second image portion, wherein said second image portion surrounds said first image portion, said boundary being defined by an interface between first periphery sub-portions of said first image portion and second periphery sub-portions of said second image portion, wherein a difference in depth data between adjacent said first periphery sub-portions and said second periphery sub-portions is above a first predetermined threshold and/or wherein said second periphery sub-portions comprises undefined depth data, determining the area of the first image portion, and if the area of the first image portion is below a second predetermined threshold, determining that the first image portion contains incorrect depth data and deleting and/or adjusting the incorrect depth data contained by said first image portion.

Advantages of the first aspect of the present invention include that the interpretation of the surroundings of the UAV is improved in a simple and yet effective way. The incorrect depth data may e.g. originate from a repetitive patter in the surrounding environment, and by deleting and/or adjusting the incorrect depth data, risks relating to such artifacts may be mitigated.

By improving the interpretation of the surroundings of a UAV is meant that incorrect interpretations of the surroundings, i.e. incorrect depth data, is deleted and/or adjusted. In other words, the interpretation of the surroundings of a UAV is improved by identifying and alleviating artifacts in the acquired image.

By sensor unit is meant a unit comprising at least one sensor. Each sensor unit may comprise only one sensor, or it may comprise two or more sensors. Thus, for embodiments in which the sensor unit only comprises one sensor, the senor unit may be referred to as a sensor. The sensor(s) comprised by the at least one sensor unit may suitably be at least one of an RGB camera, an IR camera, a radar receiver or a hyperspectral camera. Other types of sensors are also conceivable and may be used as a complement to any of the above sensor types, such as ultrasound sensors.

The image(s) created by the at least one sensor unit may be different types of images, but it must be an image containing depth data such as e.g. a 3D image. By image is meant a data set or a data matrix, and depth data may be defined as information about the distance from the surfaces of the surrounding environment to the sensor unit. The image may suitably be made up of a number of pixels.

The steps of the method may in some embodiments be performed by a control unit comprised by the UAV. In other embodiments, the images captured by the at least one sensor unit may be wirelessly sent to an external control unit, or they may be sent via a cord to an external control unit, which may perform the steps of the method. In yet other embodiments, some of the steps of the method may be performed by a control unit comprised by the UAV, and some may be performed by an external control unit.

The step of acquiring the image comprising depth data may for example comprise determining depth data of each pixel, or average depth data of a matrix of adjacent pixels (hereafter referred to as a pixel matrix), in the image.

The sub-portions of the first image portion and the second image portion may in some exemplary embodiments be pixels. In other exemplary embodiments, the sub-portions may be a group of adjacent pixels. If the sub-portions are groups of adjacent pixels, the depth data for each sub-portion may be average depth data of the pixels contained by said sub-portion. By periphery sub-portions is meant sub-portions of the image portion which are adjacent to the edge or boundary between the first and the second image portion. For example, the periphery sub-portions of the second image portion may be referred to as the inner edge sub-portions, or the sub-portions closest to the inner edge or boundary.

According to at least one example embodiment, the image may be described as extending in an x-y plane, and thus, the term adjacent typically refers to image portions/sub-portions or pixels which are neighbouring in the x-direction or y-direction.

The boundary between the first image portion and the second image portion may e.g. be determined by comparing adjacent pixels, or adjacent pixel matrices. More specifically, the step of determining the boundary between the first image portion and the second image portion, may be carried out by determining depth data jumps between adjacent pixels or adjacent pixel matrices, i.e. adjacent periphery sub-portions, wherein each depth data jump is defined by that the difference in depth data between adjacent pixels, or the difference in average depth data between adjacent pixel matrices, is above said first predetermined threshold. Alternatively, or additionally, the border may be defined by the second periphery sub-portions not containing any depth data, i.e. containing undefined depth data. By undefined depth data is meant e.g. null or the depth being 0 m. The boundary may consist of portions where the difference in depth data or average depth data is above said first predetermined threshold and portions where the second periphery sub-portions contain undefined depth data, or the border may be completely defined by one of the two criteria.

The area of the first image portion may be measured in number of pixels. In other exemplary embodiments, the area of the first image portion may be measured in any other suitable area unit, e.g. according to the metric system. The second threshold may for example be a predetermined number of pixels, or it may be defined in e.g. square centimetres.

Deleting and/or adjusting the incorrect depth data contained by the first image portion may include the data values for each sub-portion of the first image portion being set to null or to 0 m. In other embodiments, the incorrect depth data may for example be adjusted to the average depth data of the adjacent second periphery sub-portions.

According to at least one example embodiment, the method may comprise the step of determining depth data jumps between adjacent pixels, or adjacent pixel matrices, and if the depth data jumps are continuous, said boundary may be defined by the continuous depth data jumps. Thus, said first image portion and said second image portion may be defined by said boundary.

According to at least one example embodiment, the first image portion and the second image portion may be defined by the boundary. That is, all sub-portions, such as pixels or pixel matrices, within said boundary is defined as said first image portion, and adjacent sub-portions, such as pixels or pixel matrices, outside of said boundary is defined as said second image portion. The second image portion may be further defined by a second boundary outside of the first boundary, such that all sub-portions between the two boundaries is defined as the second image portion. Alternatively or additionally, the second image portion may extend to the edge of the image, and/or to a boundary defining another first image portion.

According to at least one exemplary embodiment of the first aspect of the present invention, the first image portion comprises at least a first set of adjacent pixels, and said second image portion comprises at least a second set of adjacent pixels, wherein each pixel in said second set is different from each pixel in said first set. In other words, there is no overlap between the depth data of the pixels of the first image portion and the pixels of the second image portion. Put differently, the lowest pixel value of the first image portion is higher than the highest pixel value of the second image portion, or the highest pixel value of the first image portion is lower than the lowest pixel value of the second image portion. The benefit of this is that the risk of deleting and/or adjusting pixels containing correct depth data is reduced.

According to at least one exemplary embodiment of the first aspect of the present invention, said first predetermined threshold is set based on the depth data contained by said second periphery sub-portion. If the depth data contained by said second periphery sub-portions is large, i.e. if the distance between the surface of the surroundings and the sensor unit is large, the first predetermined threshold may be greater than if the depth data contained by said second periphery sub-portion is smaller, i.e. if the distance between the surface of the surroundings and the sensor unit is shorter.

According to at least one exemplary embodiment of the first aspect of the present invention, said first predetermined threshold is set based on the area of the first image portion. If the area of the first image portion is relatively large, the first predetermined threshold may be relatively large compared to if the area of the first image portion is relatively small.

According to at least one exemplary embodiment of the first aspect of the present invention, said first predetermined threshold is at least 2 m. In other exemplary embodiments, the first predetermine threshold may be at least 5 m, or at least 7 m. In some exemplary embodiments the first predetermined threshold may be below 30 m, or below 100 m, such as e.g. between 2 m (or 5 m or 7 m) and 30 m (or 100 m). The first predetermined threshold may be set based on the maximum capacity of the sensor unit. In other words, the sensor unit has a range of depths that it is capable to read. For example, the sensor unit may have a range from 0-100 m. The maximum capacity of such a sensor unit is thus 100 m. The first predetermined threshold may be set as a percentage of the maximum capacity of the sensor unit, e.g. at least 2% of the maximum capacity, or at least 1% of the maximum capacity, or at least 7% of the maximum capacity.

According to at least one exemplary embodiment of the first aspect of the present invention, said second predetermined threshold is at most 10% of the image area. In other exemplary embodiments, the second predetermined threshold may be at most 5% of the image area, or at most 3% of the image area. The image area may suitably be measured in number of pixels contained by the image, and the second predetermined threshold may be a threshold for the number of pixels contained by the first image portion.

According to at least one exemplary embodiment of the first aspect of the present invention, said method further comprises a step of determining the shape of the first image portion. This may be beneficial since some image portions may be incorrectly identified as artifacts due to them having a small area and a large difference in depth data compared to the adjacent image portions. Such image portions may for example originate from power transmission lines. By determining the shape of the first image portion, deletion/adjusting of image portions which are not artifacts may be prevented.

According to at least one exemplary embodiment of the first aspect of the present invention, the first image portion is not identified as containing incorrect depth data if the shape of the first image portion is elongated, such that the average length of the first image portion is at least 10-30% of the length of the image. This has the same advantage as described above in relation to determining the shape of the first image portion.

According to at least one exemplary embodiment of the first aspect of the present invention, the method further comprises a step of determining that the depth data contained by said first image portion originates from an area containing a repetitive pattern such as stripes. Repetitive patterns are known to cause artifacts of the type covered by this invention, and by determining that the depth data originates from a repetitive pattern it may be avoided that image portions containing correct depth data are incorrectly identified as artifacts.

According to a second aspect of the present invention, a UAV system is provided. The UAV system comprises:

a UAV comprising at least one sensor unit configured to capture an image of a surrounding environment, a control unit configured for processing said image, said control unit being configured to acquire said image comprising depth data from said sensor unit, determine a boundary between a first image portion and a second image portion, wherein said second image portion surrounds said first image portion, said boundary being defined by an interface between first periphery sub-portions of said first image portion and second periphery sub-portions of said second image portion, wherein a difference in depth data between adjacent said first periphery sub-portions and said second periphery sub-portions is above a first predetermined threshold and/or wherein said second periphery sub-portions comprises undefined depth data, determine the area of the first image portion, and if the area of the first image portion is below a second predetermined threshold, determine that the first image portion contains incorrect depth data and delete and/or adjust the incorrect depth data contained by said first image portion.

Effects and features of this second aspect of the present invention are largely analogous to those described above in connection with the first aspect of the inventive concept. Embodiments mentioned in relation to the first aspect of the present invention are largely compatible with the second aspect of the invention, of which some embodiments are explicitly mentioned in the following. In other words, a method for improving the interpretation of the surroundings of a UAV as described with any of the embodiments of the first aspect of the invention is applicable to, or may make use of, the UAV system described in relation to the second aspect of the invention.

According to at least one exemplary embodiment of the second aspect of the present invention, the control unit is comprised by the UAV, or the control unit is an external control unit. If the control unit is an external control unit, the images captured by the at least one sensor unit may be wirelessly sent to the control unit, or they may be transferred via a cord. An advantage of the control unit being comprised by the UAV is that there is no need for transferring the images to an external control unit. On the other hand, having an external control unit may be advantageous e.g. to minimise the weight of the UAV.

According to at least one exemplary embodiment of the second aspect of the present invention, the first image portion comprises at least a first set of adjacent pixels, and said second image portion comprises at least a second set of adjacent pixels, wherein each pixel in said second set is different from each pixel in said first set. The effects and benefits of this feature are analogous to those already described in relation to the first aspect of the present invention.

According to at least one exemplary embodiment of the second aspect of the present invention, said first predetermined threshold is set based on the depth data contained by said second periphery sub-portion. The effects and benefits of this feature are analogous to those already described in relation to the first aspect of the present invention.

According to at least one exemplary embodiment of the second aspect of the present invention, said first predetermined threshold is set based on the area of the first image portion. The effects and benefits of this feature are analogous to those already described in relation to the first aspect of the present invention.

According to at least one exemplary embodiment of the second aspect of the present invention, said first predetermined threshold is at least 2 m. In other exemplary embodiments, the first predetermine threshold may be at least 5 m, or at least 7 m. In some exemplary embodiments the first predetermined threshold may be below 30 m, or below 100 m, such as e.g. between 2 m (or 5 m or 7 m) and 30 m (or 100 m). The first predetermined threshold may be set based on the maximum capacity of the sensor unit. In other words, the sensor unit has a range of depths that it is capable to read. For example, the sensor unit may have a range from 0-100 m. The maximum capacity of such a sensor unit is thus 100 m. The first predetermined threshold may be set as a percentage of the maximum capacity of the sensor unit, e.g. at least 2% of the maximum capacity, or at least 1% of the maximum capacity, or at least 7% of the maximum capacity. The effects and benefits of this feature are analogous to those already described in relation to the first aspect of the present invention.

According to at least one exemplary embodiment of the second aspect of the present invention, said second predetermined threshold is below 10% of the image area. The effects and benefits of this feature are analogous to those already described in relation to the first aspect of the present invention.

BRIEF DESCRIPTION OF THE DRAWINGS

These and other features and advantages of the present invention will in the following be further clarified and described in more detail, with reference to the appended drawings showing exemplary embodiments of the present invention.

FIG. 1b is a perspective view showing an exemplary embodiment of a sensor unit comprised by the UAV illustrated in FIG. 1a.

DETAILED DESCRIPTION OF EMBODIMENTS

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1A:
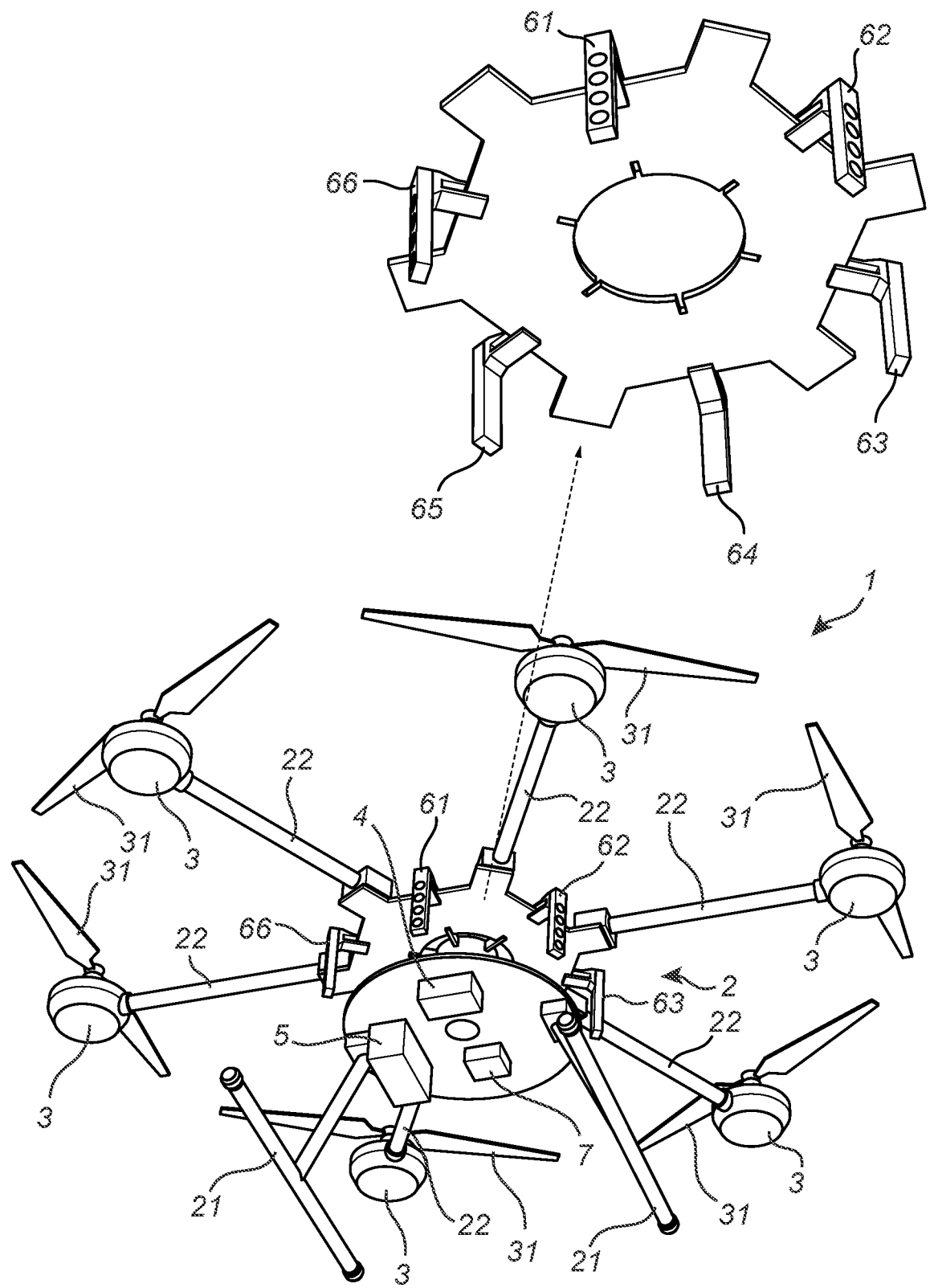
FIG. 1a is a perspective view showing an exemplary embodiment of an unmanned aerial vehicle (UAV) according to the present invention.

FIG. 1a illustrates a perspective view of an exemplary embodiment of an unmanned aerial vehicle (UAV) according to the second aspect of the present invention. The illustrated UAV 1 may be used to perform a method according to the first aspect of the present invention.

The UAV 1 comprises a body 2 having two leg portions 21. The body 2 is adapted to carry all of the other components comprised by the UAV 1, and the leg portions 21 are adapted to support the UAV 1 when it is not airborne. The UAV 1 further comprises six actuators 3 arranged on six arm portions 22 extending from the body 2. The actuators 3 are connected to six propellers 31. The actuators 3 may suitably be electrical engines or combustion engines. By controlling the actuators 3, the rotation of the propellers 31 and hence the movement of the UAV 1 may be controlled. This is preferably done by a control unit 4. The control unit 4 may be connected to the actuators 3 wirelessly, or they may be wired. The control unit 4 will be further described below.

The actuators 3 and the control unit 4 are powered by a power supply unit 5, which may suitably be some type of battery, e.g. a lithium-polymer battery, or an electrical generator of some type. The power supply unit 5 may comprise a plurality of subunits, e.g. a plurality of batteries. The size and capacity of the power supply unit 5 may be adapted to the size/weight of the UAV 1, the size/weight of potential goods that the UAV 1 is to carry, and the length of the flights that the UAV 1 is intended to perform. In some embodiments, the power supply unit may not be a part of the UAV, but the UAV may be connected to an external power supply unit, e.g. by wiring the UAV to the mains electricity.

The UAV 1 further comprises at least one sensor unit 61. In this exemplary embodiment, the UAV further comprises a second sensor unit 62, a third sensor unit 63, a fourth sensor unit 64, a fifth sensor unit 65, and a sixth sensor unit 66 angularly offset in relation to each other. Each one of the sensor units is configured to create an image of the surroundings. All of the sensor units are mounted circumferentially of the UAV, angularly offset in relation to each other. In some embodiments, a seventh sensor unit may be mounted at the centre of the UAV, facing downwards. Although only the first sensor unit 61 is described in the following detailed description, any features and method steps described in relation to the first sensor unit 61 may also be applied to the second, third, fourth, fifth and sixth sensor units 62, 63, 64, 65, 66. The sensor units 61-66 will be further described in relation to FIG. 1b.

The UAV 1 further comprises a control unit 4. The control unit 4 may for example be manifested as a general-purpose processor, an application specific processor, a circuit containing processing components, a group of distributed processing components, a group of distributed computers configured for processing, a field programmable gate array (FPGA), etc. The control unit 4 may further include a microprocessor, microcontroller, programmable digital signal processor or another programmable device. The control unit 4 may also, or instead, include an application specific integrated circuit, a programmable gate array or programmable array logic, a programmable logic device, or a digital signal processor. Where the control unit 4 includes a programmable device such as the microprocessor, microcontroller or programmable digital signal processor mentioned above, the processor may further include computer executable code that controls operation of the programmable device.

The UAV 1 according to the illustrated exemplary embodiment further comprises a GPS module 7, for navigation of the UAV 1. Other embodiments may not comprise a GPS module, or may comprise a GPS module but may not use it for navigation. In this exemplary embodiment however, correspondingly to the control unit 4, the GPS module 7 may for example include a GPS receiver, a microprocessor, microcontroller, programmable digital signal processor or another programmable device. The GPS module 7 may also, or instead, include an application specific integrated circuit, a programmable gate array or programmable array logic, a programmable logic device, or a digital signal processor arranged and configured for digital communication with the control unit 4. Where the control unit 4 includes a programmable device such as the microprocessor, microcontroller or programmable digital signal processor mentioned above, the GPS module 7 may simply comprise a GPS receiver and circuits for digital communication with the control unit 4.

The processor (of the control unit 4 and/or the GPS module 7) may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The control unit 4 is connected to the various described features of the UAV 1, such as e.g. the GPS module 7, the sensor units 61-66 and the actuators 3, and is configured to control system parameters. Moreover, the control unit 4 may be embodied by one or more control units, where each control unit may be either a general purpose control unit or a dedicated control unit for performing a specific function.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, SSD disc storage or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

It should be understood that the control unit 4 may comprise a digital signal processor arranged and configured for digital communication with an off-site server or cloud based server. Thus data may be sent to and from the control unit 4.

Figure 1B:
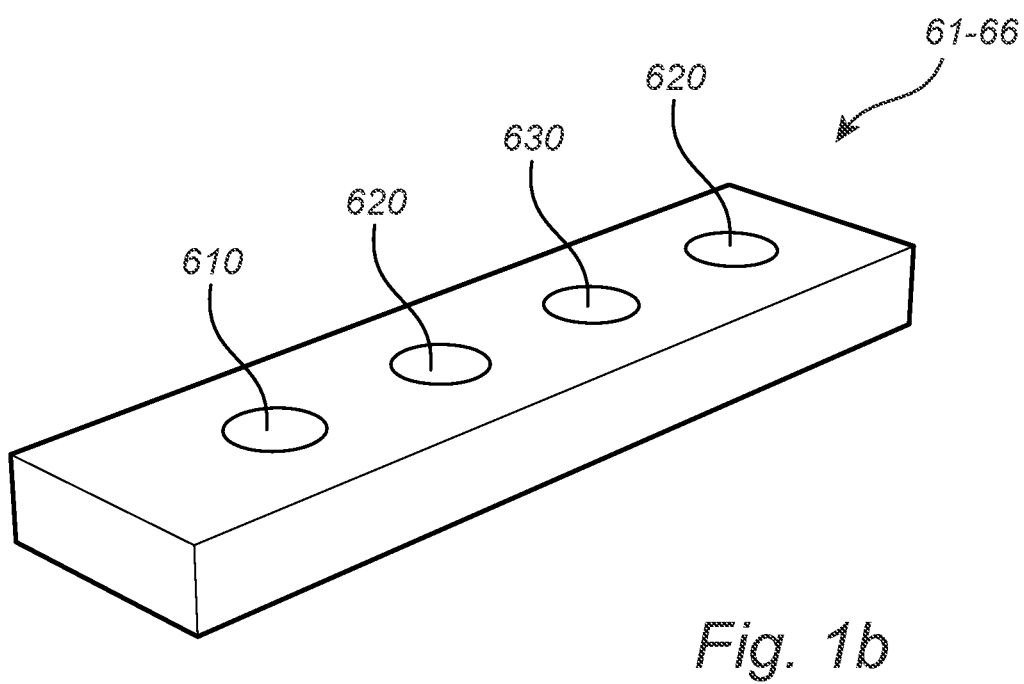

FIG. 1b illustrates a perspective view of an exemplary sensor unit 61-66 comprised by the UAV 1 illustrated in FIG. 1a. This exemplary sensor unit 61-66 comprises two different types of sensors: an RGB camera 610 and two IR cameras 620. It further comprises an IR laser projector 630. By combining two images obtained by the two IR cameras 620 it is possible to extract depth information from the image, i.e. to create a depth image or an image containing depth data. The IR laser projector 630 may be used to further illuminate the scene in order to enable extraction of depth information in any lighting condition and surface textures. The depth image may if desired be combined with an RGB image acquired by the RGB camera 610, to create a stereo image or a 3D image.

Figure 2:
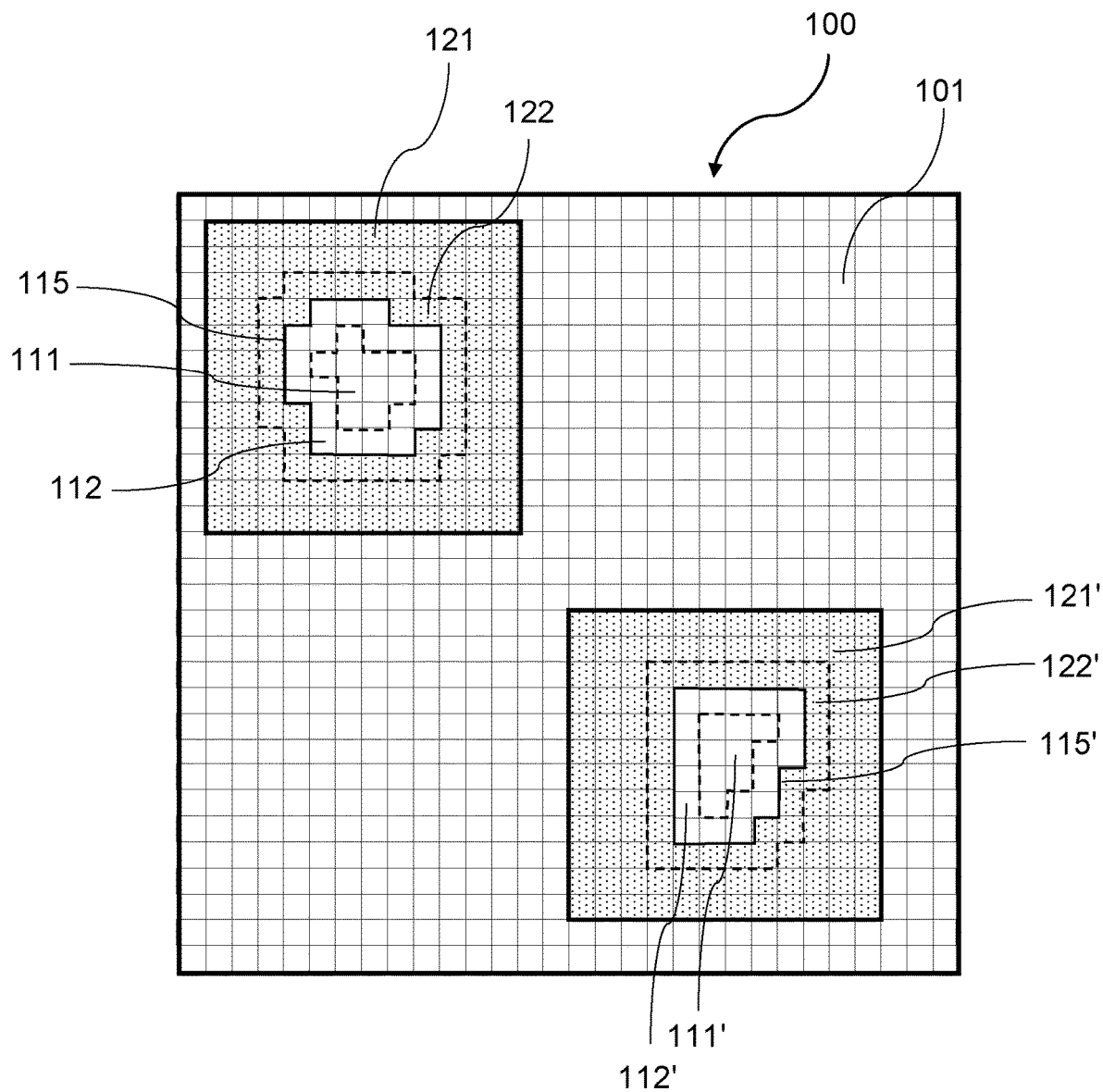
FIG. 2 is a schematic illustration of an image of a surrounding environment containing depth data.

FIG. 2 shows a schematic illustration of an image 100 of a surrounding environment containing depth data. The image 100 has been acquired from a sensor unit of a UAV, and comprises a plurality of pixels 101. Each of the pixels 101 contains depth data or undefined depth data. The image comprises a boundary 115 between a first image portion 111 and a second image portion 121. The second image portion 121 surrounds the first image portion 111. The boundary 115 is defined by an interface between first periphery sub-portions 112 of the first image portion 111 and second periphery sub-portions 122 of the second image portion 121. In this example, the interface is defined by a difference in depth data between the adjacent first periphery sub-portions 112 and second periphery sub-portions 122 being above a first predetermined threshold. The first predetermined threshold may be depth dependent, and for example be 7.5 m. The first image portion 111 also has an area, which in this exemplary embodiment is nine pixels. If the area of the first image portion 111 is below a second predetermined threshold, it may be determined that the first image portion 111 contains incorrect depth data. The depth data contained by the first image portion 111 is then deleted and/or adjusted. The second predetermined threshold may for example be 1.5% of the size of the image.

The image 100 also comprises a second boundary 115' between a third image portion 111' and another fourth image portion 121'. The third image portion 111' is analogous to a first image portion 111, and the fourth image portion 121' is analogous to a second image portion 121. For convenience, the terms third and fourth image portion are used instead. The fourth image portion 121' surrounds the third image portion 111'. The boundary 115' is defined by an interface between third periphery sub-portions 112' of the third image portion 111' and fourth periphery sub-portions 122' of the fourth image portion 121'. In this example, the interface is defined by the fourth periphery sub-portions 122' comprising undefined depth data. In this exemplary embodiment, undefined depth data is null data. In other embodiments, undefined depth data may for example be 0 m. Similarly to the first image portion 111, the area of the third image portion 111' has an area which may be compared to the second predetermined threshold. If the area of the third image portion 111' is below the second predetermined threshold, it may be determined that the third image portion 111' contains incorrect depth data. The depth data contained by the third image portion 111' is then deleted and/or adjusted.

The number of pixels 101 and the sizes of the different image portions 111, 121, 111', 121' of the exemplary image 100 are not according to scale, and should only be seen as a schematic illustration intended to illustrate the concept of the invention.

Figure 3:
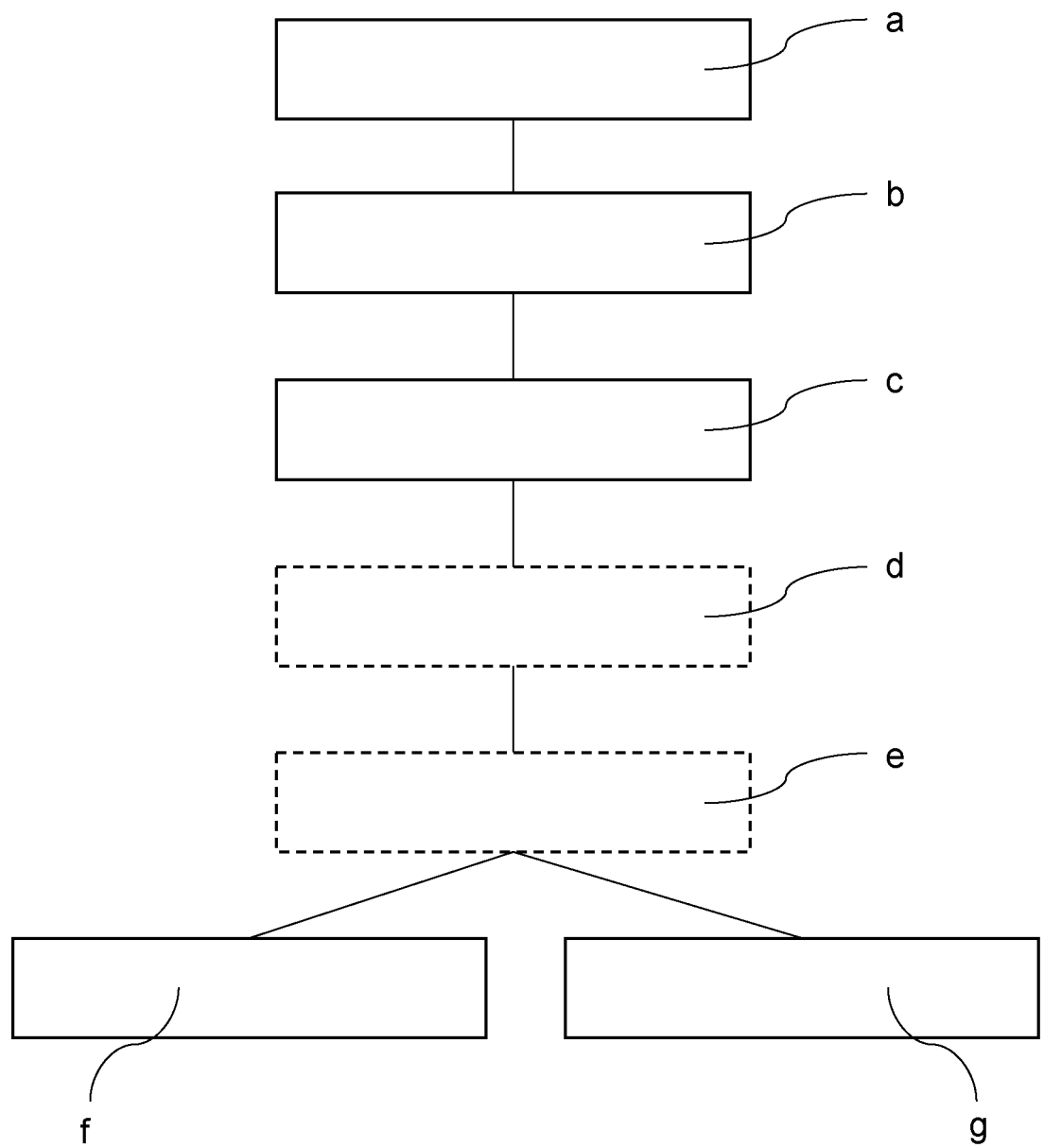
FIG. 3 is a flow chart of an exemplary embodiment of a method for improving the interpretation of the surroundings of a UAV according to the first aspect of the present invention.

FIG. 3 shows a flow chart of an exemplary embodiment of a method for improving the interpretation of the surroundings of a UAV according to the present invention. The steps of the method that are surrounded by a dashed frame are optional, i.e. steps d and e. The method will now be described in more detail, including all of the steps a-g.

The first step of the process, step a, comprises acquiring an image comprising depth data from a sensor unit comprised by the UAV. This step is suitably performed by a control unit comprised by the UAV, or by an external control unit. The image may be any suitable type of image containing depth data. When acquiring the image, depth data is identified for each pixel of the image.

After step a, step b is performed. In step b, a boundary between a first image portion and a second image portion is determined. The second image portion surrounds the first image portion, and the boundary is defined by an interface between first periphery sub-portions of the first image portion and second periphery sub-portions of the second image portion. The interface may be defined by two different criteria, or a combination of the two. The first criterion is that the difference in depth data between adjacent first periphery sub-portions and second periphery sub-portions is above a first predetermined threshold. The second criterion is that the second periphery sub-portions comprise undefined depth data. One of these two criteria must be fulfilled for each of the second periphery sub-portions in order for the boundary, and hence the first image portion, to be defined. In some embodiments, portions of the boundary may fulfill the first criterion and other portions may fulfill the second criterion, but there cannot be any portions of the boundary that do not fulfill any of the two criteria in order for the boundary to be defined. The boundary must constitute a closed boundary or a closed loop.

Step c comprises determining the area of the first image portion. The first image portion is all pixels contained inside of the boundary, and the area of the first image portion may therefore be defined as the number of pixels contained inside of the boundary. In other embodiments, the area may be measured in another unit.

Step d is an optional step which may be performed in some exemplary embodiments. In step d, the shape of the first image portion is determined. This may for example be done by determining the ratio between the width and the length of the first image portion. In some exemplary embodiments, if the first image portion has a certain shape, e.g. an elongated shape, it may be determined that the image portion does not contain incorrect depth data due to the shape of it. Such elongated shapes which may be desirable to not identify as artifacts may for example originate from power transmission lines.

Step e is also an optional step which may be performed in some exemplary embodiments. In step e, it is determined whether the depth data contained by the first image portion originates from an area containing a repetitive pattern. A repetitive pattern may for example be stripes. This step may for example be done by performing image analysis of an RGB image acquired for the same surface of the surrounding environment as the image containing depth data.

Finally, step f or step g is performed. Step f comprises determining that the first image portion contains incorrect depth data and deleting and/or adjusting the incorrect depth data contained by the first image portion, based on that the area of the first image portion is below a second predetermined threshold. If the area of the first image portion is not below the second predetermined threshold, step g is instead performed, where it is determined that the first image portion contains correct depth data which should not be adjusted and/or deleted.

The person skilled in the art realizes that the present invention by no means is limited to the embodiments described above. The features of the described embodiments may be combined in different ways, and many modifications and variations are possible within the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

What is claimed is:

1. A method for improving interpretation of surroundings of an unmanned aerial vehicle, the method comprising:
   acquiring an image (100) of an environment surrounding an unmanned aerial vehicle (UAV) with at least one sensor unit (61-66) of the UAV, the image comprising depth data from said at least one sensor unit (61-66);
   determining, by a control unit, a boundary (115, 115') between a first image portion (111, 111') and a second image portion (121, 121'), wherein said second image portion (121, 121') surrounds said first image portion (111, 111'), said boundary (115, 115') being defined by an interface between first periphery sub-portions (112, 112') of said first image portion and second periphery sub-portions (122, 122') of said second image portion when a difference in depth data between adjacent said first periphery sub-portions (112) and said second periphery sub-portions (122) is above a first predetermined threshold and/or when said second periphery sub-portions (122') comprise undefined depth data;
   determining, by the control unit, an area of the first image portion (111, 111');
   in response to the area of the first image portion (111, 111') being below a second predetermined threshold, the control unit determining that the first image portion (111, 111') contains incorrect depth data and deleting and/or adjusting the incorrect depth data contained by said first image portion (111, 111');
   in response to the area of the first image portion not being below the second predetermined threshold, validating the depth data with the control unit; and
   controlling, by the control unit, actuators of the UAV based on the depth data such that rotation of propellers connected to the actuators and hence movement of the UAV is controlled to avoid crashes and/or navigation failures.

2. The method according to claim 1, wherein the first image portion (111, 111') comprises at least a first set of adjacent pixels, and said second image portion (121, 121') comprises at least a second set of adjacent pixels, wherein each pixel in said second set is different from each pixel in said first set.

3. The method according to claim 1, wherein said first predetermined threshold is set based on the depth data contained by said second periphery sub-portions (122, 122').

4. The method according to claim 1, wherein said first predetermined threshold is set based on the area of the first image portion (111, 111').

5. The method according to claim 1, wherein said first predetermined threshold is at least 2 m.

6. The method according to claim 1, wherein said second predetermined threshold is at most 10% of the image area.

7. The method according to claim 1, further comprising: determining a shape of the first image portion (111, 111').

8. The method according to claim 7, wherein the first image portion (111, 111') is not identified as containing incorrect depth data if the shape of the first image portion (111, 111') is elongated so that an average length of the first image portion (111, 111') is at least 10-30% of a length of the image.

9. The method according to claim 1, further comprising: determining that the depth data contained by said first image portion (111, 111') originates from an area containing a repetitive pattern.

10. An unmanned aerial vehicle (UAV) system with improved interpretation of surroundings, comprising:
   a UAV (1) comprising at least one sensor unit (61-66) configured to capture an image (100) of a surrounding environment, actuators, and propellers connected to the actuators; and
   a control unit (4) configured for processing said image (100) and connected to the at least one sensor unit (61-66) and the actuators, said control unit (4) being configured to:
      acquire said image (100) comprising depth data from said at least one sensor unit (61-66);
      determine a boundary (115, 115') between a first image portion (111, 111') and a second image portion (121, 121'), wherein said second image portion (121, 121') surrounds said first image portion (111, 111'), said boundary (115, 115') being defined by an interface between first periphery sub-portions (112, 112') of said first image portion and second periphery sub-portions (122, 122') of said second image portion, when a difference in depth data between adjacent said first periphery sub-portions (112) and said second periphery sub-portions (122) is above a first predetermined threshold and/or when said second periphery sub-portions (122') comprises undefined depth data;

determine an area of the first image portion (111, 111');

in response to the area of the first image portion (111, 111') being below a second predetermined threshold, determine that the first image portion (111, 111') contains incorrect depth data and delete and/or adjust the incorrect depth data contained by said first image portion (111, 111');

in response to the area of the first image portion not being below the second predetermined threshold, validating the depth data; and control the actuators based on the depth data such that rotation of the propellers so that movement of the UAV is controlled to avoid crashes and/or navigation failures.

11. The UAV system according to claim 10, wherein said control unit (4) is comprised by said UAV (1), or wherein said control unit (4) is an external control unit.

12. The UAV system according to claim 10, wherein the first image portion (111, 111') comprises at least a first set of adjacent pixels, and said second image portion (121, 121') comprises at least a second set of adjacent pixels, wherein each pixel in said second set is different from each pixel in said first set.

13. The UAV system according to claim 10, wherein said first predetermined threshold is set based on the depth data contained by said second periphery sub-portions (122, 122').

14. The UAV system according to claim 10, wherein said first predetermined threshold is set based on the area of the first image portion (111, 111').

15. The UAV system according to claim 10, wherein said first predetermined threshold is at least 2 m.

16. The UAV system according to claim 10, wherein said second predetermined threshold is at most 10% of the image area.

17. The UAV system according to claim 10, wherein the control unit (4) is further configured to:

determine a shape of the first image portion (111, 111').

18. The UAV system according to claim 17, wherein the first image portion (111, 111') is not identified as containing incorrect depth data if the shape of the first image portion (111, 111') is elongated so that an average length of the first image portion (111, 111') is at least 10-30% of a length of the image.

19. The UAV system according to claim 10, wherein the control unit (4) is further configured to:

determine that the depth data contained by said first image portion (111, 111') originates from an area containing a repetitive pattern.

* * * * *